United States Patent [19]
Leiber et al.

[11] Patent Number: 5,201,573
[45] Date of Patent: Apr. 13, 1993

[54] HYDRAULIC DUAL-CIRCUIT BRAKE SYSTEM

[75] Inventors: Heinz Leiber, Oxerriexingen; Manfred Steiner; Walter Klinkner, both of Stuttgart, all of Fed. Rep. of Germany

[73] Assignee: Mercedes-Benz AG, Fed. Rep. of Germany

[21] Appl. No.: 575,634

[22] Filed: Aug. 31, 1990

[30] Foreign Application Priority Data

Aug. 31, 1989 [DE] Fed. Rep. of Germany ....... 3928874

[51] Int. Cl.$^5$ .................... B60T 8/32; B60T 11/24; B60T 15/02
[52] U.S. Cl. ...................................... 303/92; 60/535; 60/545; 303/100; 303/113.4
[58] Field of Search ............... 303/6.01, 9.61, 52, 303/113, 114, 92, 100, DIG. 3, DIG. 4, 113 R, 113 TR, 113 TB, 113 SS, 114 R, 114 PB, 114 PN; 60/545, 582, 581, 580, 550, 551, 592, 535; 180/197; 188/345, 1.11, 355-359, 354; 91/369.1

[56] References Cited

U.S. PATENT DOCUMENTS

| | | | |
|---|---|---|---|
| 4,025,781 | 5/1977 | Brearley | 188/1.11 X |
| 4,143,514 | 3/1979 | Leiber | 303/92 X |
| 4,357,055 | 11/1982 | Leiber et al. | 303/52 |
| 4,478,461 | 10/1984 | Leiber | 303/92 |
| 4,557,528 | 12/1985 | Leiber | 303/114 X |
| 4,568,130 | 2/1986 | Leiber | 303/114 X |
| 4,620,750 | 11/1986 | Leiber | 303/92 X |
| 4,776,643 | 10/1988 | Leiber | 303/92 |
| 4,783,125 | 11/1988 | Belart et al. | 303/92 |
| 4,824,186 | 4/1989 | Leiber et al. | 303/100 X |
| 4,967,643 | 11/1990 | Siegel | 60/545 X |

FOREIGN PATENT DOCUMENTS 2539348 3/1976 Fed. Rep. of Germany .
3723916 1/1989 Fed. Rep. of Germany .

*Primary Examiner*—Douglas C. Butler
*Attorney, Agent, or Firm*—Evenson, Wands, Edwards, Lenahan & McKeown

[57] ABSTRACT

A hydraulic dual-circuit brake system has brake booster with a first output pressure chamber allocated to the front-axle brake circuit I and a second output pressure chamber allocated to the rear-axle brake circuit II. The chambers are movably delimited by master cylinder pistons, to each of which is allocated a position sensor. An electronic control device is provided to process the output signals of the position sensors and to emit control signals for a valve arrangement by which a brake circuit which is poorly bled or leaking is blocked off from its master brake line. The electronic control device includes a comparator, which compares the positions, represented by the two output signals of the positions, represented by the two output signals of the position sensors, of the pistons of the brake booster to one another and produces a signal for the purpose of driving the valve arrangement into its blocking position as soon as the positions of the brake booster piston allocated to the front-axle brake circuit corresponds to a stroke which is greater by more than a threshold value ΔSmax than the stroke of the brake booster piston represented by the position-indicating signal of the brake booster piston allocated to the rear-axle brake circuit. The electronic control device allows this signal to decay again when the difference of the piston strokes falls below a smaller threshold value ΔSmin.

22 Claims, 2 Drawing Sheets

HYDRAULIC DUAL-CIRCUIT BRAKE SYSTEM

BACKGROUND AND SUMMARY OF THE INVENTION

The present invention relates to a hydraulic dual-circuit brake system for a road vehicle having front-axle and rear-axle brake circuits and, more particularly, to a system having, an electronic control device which emits a control signal for a valve arrangement such that a brake circuit which is, due to malfunction or the like causing deviation of the piston position from a setpoint range, is blocked off from an associated master brake line.

A brake system of the above-mentioned kind is shown in DE-37 23 916 A 1 in connection with a road vehicle which is also equipped with an anti-locking system. The wheel brakes can be blocked off individually or together from the master brake line of the respective brake circuit by driving solenoid valves, such as brake-pressure control valves, using output signals of an electronic control device. The brake booster provided in the known bake system is a twin master cylinder having a housing with two parallel cylinder bores which are arranged at a lateral spacing from one another and in which, in each case one master cylinder piston is bounded displaceably in pressure-tight fashion. The pistons form the axially movable boundary of a brake-booster output pressure chamber allocated to the front-axle brake circuit and the rear-axle brake circuit, respectively.

The actuating force, controllable by actuation of a brake pedal in the known system and, if required, increased by a brake power assist unit, acts on a plunger rod, which is axially displaceable on the housing of the brake booster in the direction of displacement of the master cylinder pistons and, to the master-cylinder end of which is swivellably coupled a two-armed rocker. The rocker arms of the rocker are supported axially, e.g. in each case via a tappet, against the master cylinder pistons, the actuating force thereby being "distributed" to the master cylinder pistons. The ratio L1/L2 of the lengths L1 and L2 of the rocker arms measured between the swivelling axis of the rocker and the central longitudinal axes of the master cylinder bores and their pistons corresponds to the ratio F1/F2 of the cross-sectional areas of the two master cylinder bores. The rocker with the shorter rocker arm is supported against the piston with the larger cross-sectional area. In this known construction of the brake booster, equal output pressures in the output pressure chambers of the brake booster also correspond to equal piston paths—assuming an equal degree of bleeding of the two brake circuits.

An electronic displacement sensor is allocated to each of the two pistons. The output signal of the sensor is a measure of the piston position and increases or decreases, for example linearly, with displacements of the pistons in accordance with brake pressure increase or reduction, respectively. The displacement sensors are designed in such a way that they emit signals with the same level for the same piston strokes. If, in the case of normal braking, i.e. braking not subjected to regulation, the output signals of the two displacement sensors signal that one of the two master cylinder pistons has been displaced by more than a threshold value, $\Delta$Smax, further in the direction of a brake pressure build-up than the other master cylinder piston, the electronic control device rates this as a poor degree of bleeding or failure of that brake circuit whose master cylinder piston has been displaced and produces an output signal or an output signal combination which moves the brake pressure control valve(s) of this faulty brake circuit into the blocking position. A warning signal which indicates to the driver that the brake system is faulty also flashes.

The blocking off of the wheel brakes of the faulty brake circuit from that output pressure chamber of the brake booster which is allocated to it prevents an excessive collapse of the brake pedal, which could irritate or surprise the driver, who is however nevertheless informed by the warning system. In the known brake system, the brake pressure control valve(s) of the faulty brake circuit remain closed until braking, detectable from the decay of the output signal of the brake light switch, is complete.

A disadvantage of the known brake system is the fact that if the blocked brake circuit is merely poorly bled, it can no longer contribute to the development of braking force in the case of a further increase of the actuating force and this can be associated with a considerable loss of otherwise achievable vehicle retardation. This is particularly serious when the faulty brake circuit is the front-axle brake circuit, via which the portion of the usable braking force is normally produced.

It is, therefore, an object of the present invention to improve a brake system such that, irrespective of an effective collapse limitation of the brake pedal when the front-axle brake circuit has failed, a maximum possible utilization of the brake force producible via the front-axle brake circuit is guaranteed in the case of only partial failure of the latter due to poor bleeding.

This object has been achieved in accordance with the present invention by providing the electronic control device with a comparator which compares the positions, represented by two output signals of two positions sensors, of the pistons of the brake booster to one another and produces a signal for the purpose of driving the valve arrangement into its blocking position as soon as the position of the brake booster piston allocated to the front-axle brake circuit corresponds to a stroke which is greater by more than a threshold valve, $\Delta$Smax, than the stroke of the brake booster piston represented by the position-indicating signal of the brake circuit and allows this signal to decay again when the difference of the piston strokes falls below a smaller threshold value, $\Delta$Smin. By virtue of the reconnection, now possible according to the present invention, of the wheel brakes of the faulty brake circuit to their allocated output pressure chamber of the brake booster as soon as the stroke difference of the brake booster pistons has decreased to a lower difference threshold value, Smin, the brake pressure in the poorly bled, brake circuit can be increased at least approximately to that amount which, given the poor degree of bleeding, can still be developed and a clear gain in terms of safety in the sense of stable braking behavior is consequently achieved in most practical cases. In the event of a failure of the front-axle brake circuit, the "pedal feel" achieved does at least not differ significantly from the pedal feel established in the case of braking when the brake system is completely intact and therefore also dose not mislead the driver into incorrect panicky reactions.

By virtue of a second comparator having a function which produces an output signal for driving the valve arrangement into its blocking position when the piston movably delimiting the front-axle pressure chamber reaches its end position, it is achieved that, as the brake pressure in the malfunctioning front-axle brake circuit cannot be increased further, that brake circuit is blocked off from its allocated output pressure chamber, after which a further brake pressure increase takes place only in the still intact brake circuit. Also, the pedal travel required to increase the development of braking force in minimized.

It is the purpose of a delay stage with a function to switch over the value arrangement into its normal throughflow position for a defined period of time that, as seen in relation to the functional condition of the brake system, an optimum front-axle/rear-axle distribution of braking force can be established in the course of a prolonged braking.

Switching over of the valve arrangement to meet requirements, with, as is were, variable "clock frequency", is obtained by a storage element which, when the position difference $\Delta S$ of the two brake booster pistons is greater than a threshold value, $\Delta Smax$, is set to emit a signal effecting driving if the valve arrangement into its blocking positions and is reset by a comparator output signal.

As an alternative to the foregoing or even in combination with it, it is within the scope of the present invention to control the switching over of the solenoid valve arrangement with a fixed clock frequency by its own clock generator, with as high a clock frequency as possible being advantageous here.

Simple logic combinations of the comparator output signals and of an output signal of the delay stage which effect a driving of the solenoid valve arrangement suitable to the situation are used.

If a twin master cylinder having pistons activated via a moment-compensating rocker is provided as the brake booster, a particularly advantageous construction of the displacement sensors is possible in the form of inductive or resistive sensor elements.

Alternatively, brake booster pistons having a conical or ramp-shaped surface against which a mechanical feeler element can be radially supported are particularly suitable for a brake booster in the form of a tandem master cylinder.

If the vehicle is equipped with an anti-locking system, its brake pressure control valves can be used for the clocked blocking off of the poorly bled brake circuit.

BRIEF DESCRIPTION OF THE DRAWINGS

These and other objects, features and advantages of the present invention will become more readily apparent from the following detailed description of the drawings wherein.

DETAILED DESCRIPTION OF THE DRAWINGS

Figure 1:
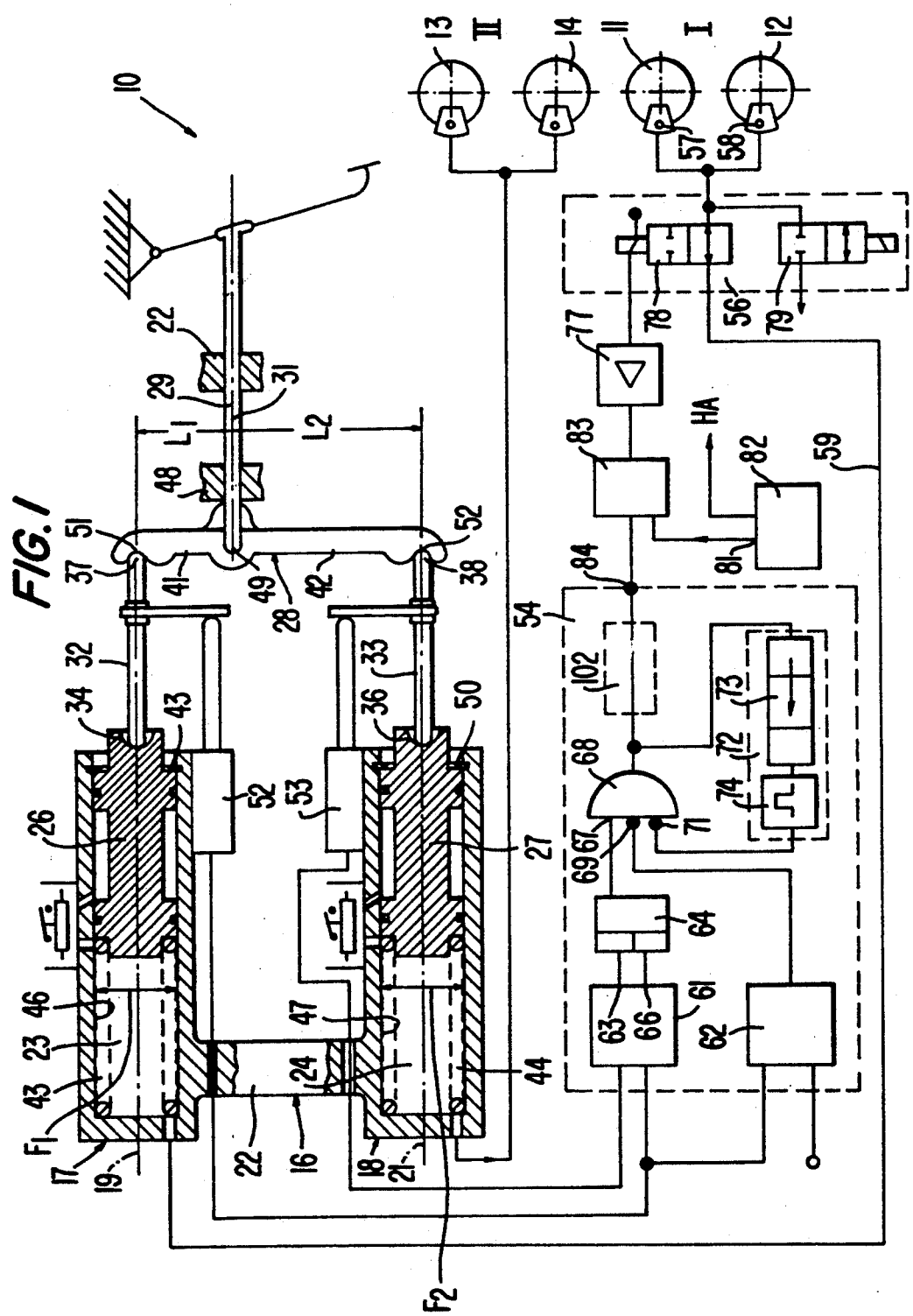
FIG. 1 is a schematic diagram of a dual-circuit brake system according to the present invention.

In the hydraulic dual-circuit brake system according to the present invention denoted generally by the numeral 10 in FIG. 1 for a road vehicle, front-wheel brakes 11 and 12 of the vehicle are combined to form a front-axle brake circuit V and the rear-wheel brakes 13 and 14 of the vehicle are combined to form a rear-axle brake circuit H.

The brake booster is a twin master cylinder designated generally by the numeral 16, and includes two master cylinder 17 and 18, each of which is allocated to one of the two brake circuits V and H. The master cylinders 17, 18 are arranged in a common housing 22, lying side by side with parallel central longitudinal axes 19 and 21.

The pistons 26 and 27 movably delimit the output pressure chambers 23 and 24 of the master cylinders 17 and 18, respectively, of the brake booster 16 and have different effective cross-sectional areas F1 and F2. The ratio F1/F2 corresponds to the ratio VV/VH of the brake fluid volumes VV and VH which must be displaced from the output pressure chamber 23 of the master cylinder 17 allocated to the front-axle brake circuit V and from the output pressure chamber 24 of the master cylinder 18 allocated to the rear-axle brake circuit H during braking in order to build up in each case the same brake pressure P in the front-wheel brakes 11 and 12 and rear-wheel brakes 13 and 14 connected to these output pressure chambers 23 and 24.

To actuate the two master cylinders 17 and 18, a rocker denoted generally by the numeral 28 is articulated on the mastercylinder end of a plunger rod 29 which is displaceably guided on the housing 22 of the brake booster 16 along an axis 31 which runs in the plane defined by the central axes 19 and 21 of the two master cylinders 17 and 18. Via plunger rod 29, an actuating force, amplified if required by a brake power assist unit (not shown), with which the driver actuates a brake pedal 30, is transmitted to the rocker 28 and through the rocker 28, via tappets 32 and 33, to the master cylinder pistons 26 and 27. In the illustrated normal position of the master cylinder pistons 26 and 27, which corresponds to the unactuated condition of the brake system 10, these tappets 32 and 33 extend along the central longitudinal axes 19 and 21 of the master cylinders 17, 18, respectively, and are supported by spherical-headed ends in cup-shaped depressions 26, 27 and of the free ends, respectively, of the rocker arms 41, 42 of the rocker 28. The pistons 26, 27 of the two master cylinders 17, 18, their tappets 32, 33 and the rocker 28 are biased or urged into their illustrated normal position by the piston return springs 43, 44. The normal position is marked by rearward retaining rings 45, 50 which are inserted into annular grooves of the cylinder bores 46, 47 respectively, and by stop 48, fixed to the housing, for the rocker 28. As measured between the central longitudinal axis 31 of the plunger rod 29 and the central axes 19, 21 of the two master cylinders 17, 18, the swivelling axis 49 extends perpendicular to the plane defined by the two central axes 19, 21 of the two master cylinders 17, 18, and is at a distance L1 from that point of support 55 of the tappet 32 allocated to the front-axle master cylinder 17 which is on the rocker side and at a distance L2 from that point of support 52 of the actuating tappet 33 allocated to the rear-axle master cylinder 18 which on the rocker side. The ratio L1/L2 corresponds to the ratio of the effective lengths of the rocker arms 41, 42 of the rocker 28. It is also equal to the ratio F2/F1 of the cross-sectional area F2 of the piston 27 of the master cylinder 18 allocated to the rear-axle brake circuit H to the cross-sectional area F1 of the piston 26 of the master cylinder 17 allocated to the front-axle brake circuit I.

In this embodiment of the brake booster 16, the rocker 28 is "moment-compensated", i.e., assuming the same bleed condition of the two master cylinders 17 and 18, the two pistons 26 and 27 perform the same strokes in order to achieve a particular brake pressure value in the front-axle brake circuit V and in the rear-axle brake circuit H.

Each of the two master cylinders 17 and 18 of the brake booster 16 is equipped with an electronic displacement or position sensor 52 and 53 respectively, of conventional construction (shown schematically) to emit an electrical output signal unambiguously associated with the position of the respective master cylinder piston 26 and 27.

The brake booster 16 with the structure explained thus far can be taken as generally known, it being possible for the output signals of the displacement sensors to be evaluated in order to determine the degree of bleeding in units of the brake pressure.

In the brake system 10 according to FIG. 1, the output signals of the two displacement sensors 52, 53 are also used as inputs for control device denoted generally by the numeral 54. The purpose of the device 54 is, in the event that the front-axle brake circuit has failed or is poorly bled, to produce output signals with which it is possible, in clock fashion, to derive a valve arrangement 56 by which the wheel brake cylinders 57, 58 of the front-wheel brakes 11, 12 are alternately blocked off from the master brake line 59 of the front-axle brake circuit V and are reconnected to the latter in order thereby to prevent a spontaneous "collapse" of the brake pedal 30 in the initial phase of braking or to reduce it to such an extent that, when initiating braking, the driver is not startled by an unusually large pedal travel and thereby is not caused to react incorrectly.

Figure 2:
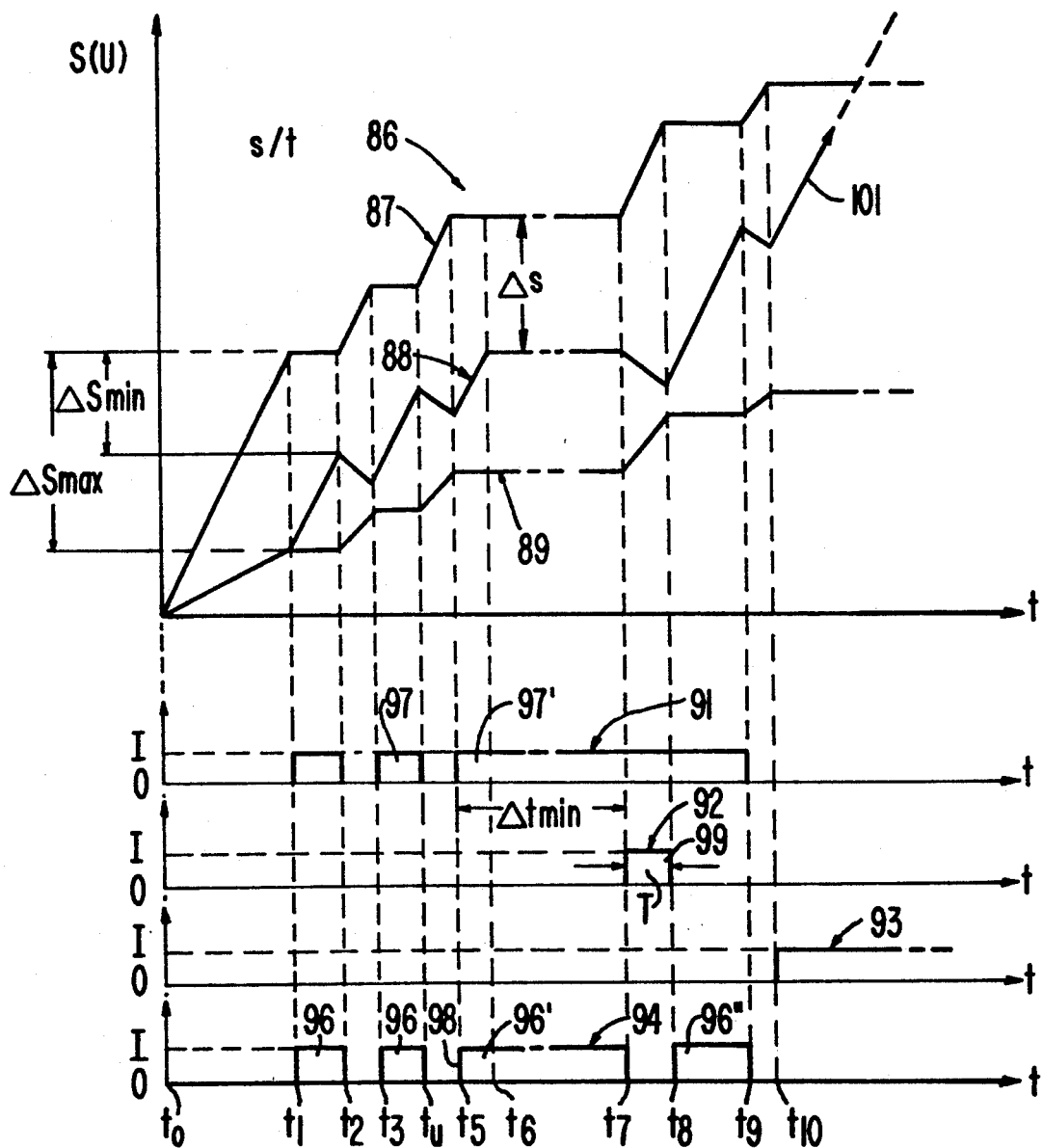
FIG. 2 is a timing diagram to illustrate the functioning of the brake system shown in FIG. 1.

To explain the operation of the electronic control device 54, reference should now also be made to the timing diagram of FIG. 2. For purpose of explanation where the front-axle brake circuit V is very poorly bled, the paths of the pistons 26, 27 in a braking operation and the output signals of various functional components of the electronic control device 54 are represented as a function of time in a simplified, idealized form for the brake system according to FIG. 1. Here it has been assumed that without countermeasures, the piston 26 of the master cylinder 17 of the front-axle brake circuit V would execute three times the stroke of the piston 27 of the master cylinder 18 of the rear-axle brake circuit H upon actuation of the brake system 10 in order to build up the same pressure in the output pressure chamber 23 of the master cylinder 17 as in the output pressure chamber 24 of the master cylinder 18 of the rear-axle brake circuit H. It is furthermore assumed that the displacement sensors 52, 53 have the same displacement-/output signal characteristic, i.e. supply voltage output signals of the same voltage level for the same amount of deflection of the pistons 26, 27 out of their normal position, and these voltage output signals should be proportional to the piston path travelled.

In other respects, for the clarity of following description of individual components of the electronic control device 54, these components can be adequately described by reference to their function because a person skilled in the relevant art will know how to construct these components using common electronic circuit technology.

As input stages, the electronic control device 54 includes a first comparator 61 to which the output signals of the two displacement sensors 52 and 53 are fed as input signals, and a second comparator 62 which, from the comparison of the output signals emitted by the displacement sensor 52 allocated to the front-axle master cylinder 17 with a reference signal, Uref, detects when piston 26 of the front-axle master cylinder 17 has reached, or has moved into the immediate vicinity of, its end position normally corresponding to maximum output pressure.

At a first output 63, the first comparator 61 emits a high-level output signal (I) if, and for as long as, the path travelled by the piston 26 of the front-axle master cylinder 17 with the effect of a brake pressure build-up in the output pressure chamber 23 of the master cylinder 17 is greater by more than upper threshold value, $\Delta S_{max}$, than the path travelled in the same direction by the piston 27 of the rear-axle master cylinder 18. With such a high-level output signal I of the first comparator 61, a storage element 64, constructed, for example, as a set reset flip-flop, is set to a high logical output signal level. At a second output 66, the comparator 61 emits an output signal in the form of a high-level signal I for as long as the difference of the displacement paths travelled by the two pistons 26 and 27 is smaller than a lower limit $\Delta S_{min}$. The high-level output signal I emitted at the second output 66 of the comparator 61 resets the storage elements 64 to a low output signal level.

The output signal of the storage element 64 is thus a high-level output signal if and for as long as the difference of the paths travelled by the master cylinder pistons 26 and 27 has a value between $\Delta S_{max}$ and $\Delta S_{min}$ and this path difference $\Delta S$ is simultaneously decreasing. The output signal of the storage element 64 is fed to a non-negated first input 67 of a three-input AND element 68, to which the output signal of the second comparator 62 is fed at a negated second input 69. At a negated third input 71, the AND element 68 receives, as a third input signal, the output signal of a delay stage, denoted generally by numeral 72, to which the output signal of the output signal of the AND element 68 is fed as an input signal.

In the illustrated embodiment, the delay stage 72 includes as an input stage a rise-delayed timer 73 which, after the output signal of the AND element 68 has been present for a minimum period, $\Delta t_{min}$, as a high-level signal, emits a control pulse by which an output stage 74 constructed as a one-shot multivibrator is driven to emit a control pulse 76 (FIG. 2) of defined duration T, which is fed to the second, negated input 71 of the AND element 68. As a result, the AND element 68 is inhibited for at least the duration of this pulse 76, i.e. remains held at low output-signal level.

With the output signal of the AND element 68 it is possible, via a driver stage 77, to drive a solenoid valve represented as a 2/2-way valve 78 out of its illustrated normal position 0, i.e. its throughflow position, in which the wheel brake cylinders 57 and 58 of the two front-wheel brakes 11 and 12 are connected to the master brake line 79 of the front-axle brake circuit I, into its blocking position I.

The solenoid valve arrangement 56 allocated to the front-axle brake circuit V, can also include a simple anti-locking system with a second 2/2-way solenoid valve 79. The normal position of the valve 79 is the blocking position. The 2/2-way solenoid valve 78 has the function of an inlet valve, via which, in a braking operation not subjected to regulation, brake pressure can be coupled into the wheel cylinders 57 and 58 of the two front-wheel brakes 11 and 12 and also reduced again.

An output 81, allocated to the inlet valve 78, of an electronic control unit 82 of the anti-blocking system is decoupled with respect to the control output 84 of the electronic control device 54 by an OR element 83.

The operation of the brake system 10 explained thus far in terms of structure and function in the above mentioned case of poor bleeding of the front-axle circuit V is now described in more detail.

For braking beginning at time t0, the "uppermost" curve trace 87 of the S/t diagram designated generally by the numeral 86 reproduces the time characteristic of the voltage output signal of the displacement sensor 52 detecting the piston stroke or the position of the piston 26 of the front-axle master cylinder 17. The central curve trace 88 reproduces the time characteristic of the output signal of the displacement sensor 53 which detects the position of the piston 27 of the master cylinder 18 allocated to the rear-axle brake circuit II.

On the scale to which the level of the output signal of the displacement sensor 53 represents the pressure in the output pressure chamber 24 of the rear-axle master cylinder 18, the lower curve trace 89 of the S/t diagram 86 represents the pressure in the output pressure chamber 23 of the master cylinder 17 allocated to the front-axle brake circuit I assumed to be poorly bled. The four further pulse trains 91–94 varying between the logic signal levels, 0 and I, reproduce on the same time scale as the S/t diagram 86 the time characteristics of the output signals of the storage element 64 connected downstream of the first comparator 61 (pulse train 91), the output signal of the output stage 74 of the delay stage 72 (pulse train 92), the output signal of the second signal comparator (pulse trains 93) and the output signal of the AND element 68 (pulse train 94).

From the beginning of braking at time t0, the brake pressure in the output pressure chambers 23, 24 of both master cylinders 17, 18 rises with essentially the same rate of change, although the piston 26 of the front-axle master cylinder 17 undergoes a greater displacement than the piston 27 of the rear-axle master cylinder 18. At time t1, the difference of the displacement paths of the two master cylinder pistons 26 and 27 corresponds, for the first time, to the amount $\Delta S_{max}$, as a result of which the storage element 64, triggered by the output signal (not reproduced in the illustration in FIG. 2) emitted at the first output 63 of the comparator 61, is set to high output-signal level, as is the output of the AND element 68, since low-level signals are present at both inverting inputs 69 and 71 of the AND elements 68. For the duration of the output pulse 96 of the AND element 68 resulting from this setting at the high output-signal level, the 2/2-way solenoid valve is driven by the AND element 68 into its blocking position I. The two front-wheel brakes 11 and 12 are now blocked off from the master brake line 59 of the front-axle brake circuit I.

From time t1, the piston 26 of the front-axle master cylinder 17 remains stationary and its output pressure in chamber 23 remains constant. If the driver actuates the brake pedal 30 further, the piston 27 of the rear-axle master cylinder 18 is pushed further at approximately the same speed from time t1 as was previously the piston 26 of the front-axle master cylinder, until, at time t2, the difference of the displacement paths executed up until then of the two pistons 26 of 27 corresponds only to the value $\Delta S_{min}$. The high-level output signal triggered at this time at the second output 66 of the first comparator 61 resets the storage element 64 from high to low output signal level, and likewise, the output signal 96 of the AND element 68. The 2/2-way solenoid valve 78 falls back into its throughflow position 0, the wheel cylinder 57 and 58 of the two front-wheel brakes 11 and 12 thereby again being connected to the master brake line 59 of the front-axle brake circuit I.

Due to compensatory swivelling movements of the rocker 28 and the further actuation of the brake pedal 30, the pressure in the output pressure chamber 24 of the rear-axle master cylinder 18 falls somewhat, and the piston 27 of the master cylinder 18 is also pushed back a little, whereas the piston 26 of the front-axle master cylinder 17 continues to be displaced in the direction of a brake pressure build-up in the output pressure chamber 23 of the front-axle master cylinder 17, i.e. in the forward direction until, at time t3—for the second time—the difference of the brake pressure build-up strokes executed by the pistons 26 and 27 of the master cylinders 17 and 18 up until then corresponds to the threshold value $\Delta S_{max}$ and a high-level output pulse 97 and 96 of the storage element 64 and of the AND element 68, respectively, is triggered once again. The 2/2-way solenoid valve 78 is thereby again moved into its blocking position I. At time t4, this blockage of the 2/2-way solenoid valve 78 is canceled again, until, at time t5, the difference of the total displacement paths of the two pistons 26 and 27 again corresponds—for the third time in the illustrated example—to the threshold valve $\Delta S_{max}$ and the solenoid valve 78 is once again switched to its blocking position.

Let it now furthermore be assumed that, from the time t6 at which the difference $\Delta S$ in the piston position is still greater than the value $\Delta S_{min}$, the driver does not move the brake pedal 30 further but holds his actuating force constant, with the consequence that the high-level output signals 97' and 96' of the respective storage element 64 and of the AND element 68 remain present. Triggered by the leading edge 98 of the output signal 96' of the AND element 68—at time t7—after a delay period $\Delta t_{min}$, the delay stage 72 then initiates the high-level pulse 76 of adjustably predetermined duration T which, via the inverting input 71 of the AND element 68, inhibits the AND element 68 for the pulse duration T.

For the duration T of this high-level output pulse 76 of the delay stage 72, the 2/2-way solenoid valve 78 is back in its throughflow position 0. Although, as assumed above, the driver holds the pedal force constant, compensatory movements of the rocker 28 result in a further displacement of the piston 26 of the front-axle master cylinder 17 in the "forwards" direction and a corresponding "rearward" movement of the piston 27 of the rear-axle master cylinder 18, which leads in effect to a raising of the brake pressure in the front-axle brake circuit V and a compensatory reduction of the brake pressure in the rear-axle brake circuit H, it being possible for the difference $\Delta S$ of the displacement path of the two pistons 26 and 27 to rise to a value which is markedly greater than the value $\Delta S_{max}$.

With the decay of the high-level pulse 76 of the delay stage 92 at time t8, the inhibition of the AND element 68 is canceled, and a high-level output pulse 96" of the AND element 68 is triggered once again. As a result the 2/2-way solenoid valve 78 is driven into its blocking position again. Assuming that the driver has in the meantime increased the actuating force again, the piston 27 of the rear-axle master cylinder is displaced further in the direction of a brake pressure build-up in the rear-axle brake circuit H, while the piston 26 of the front-axle master cylinder remains stationery, until, at time t9, the position difference of the two pistons 26 and 27 again corresponds to the lower limit ΔSmin and the storage element 64 is accordingly reset and the output pulse 96" of the AND element 68 decays. The lower threshold value ΔSmin satisfies the relationship ΔSmin≈ΔSmax/n where 2<n<5, and ΔSmax is one third of the maximum displacement path of the piston 26 associated with the front-axle master cylinder 17. In the course of the subsequently occurring "forward" movement of the piston 26 of the front-axle master cylinder 17, at time t10, even before the path difference ΔS reaches the maximum value ΔSmax again, the end position of its piston 26, corresponding to minimum volume of the output pressure chamber 23 of the front-axle master cylinder 17 is reached, this being acknowledged by the emission of its high-level pulse 93. From the onset of the pulse 93, the AND element 68 remains inhibited and the 2/2-way solenoid valve 78 remains held in its open position 0. Brake pressure can now be increased by further actuation of the brake pedal 30 only in the rear-axle brake circuit II, as illustrated in the S/t diagram 86 by the last, rising branch 101 of the output signal 68 of the displacement sensor 53 of the rear-axle master cylinder 18.

If the front-axle brake circuit V were to fail completely due to a leak between the valve arrangement 56 and the wheel brakes 11 and 12, the same characteristic as shown in the S/t diagram 86 results, qualitatively, as regards the time characteristic of the displacement sensor output signals 87, 88, but with steeper rises of the output signal 87 of the displacement sensor 52 allocated to the front-axle master cylinder 17 between the blocking phases of the solenoid valve 78 and correspondingly steeper decay phases of the output signal of the displacement sensor 53, which monitors the piston position in the rear-axle master cylinder 18. In addition, it is of course impossible, in the event of the front-axle brake circuit having failed, for brake pressure to be built up in the front-axle brake circuit.

Clocked driving of the solenoid valve 78 can also be implemented, as indicated by dashed lines in FIG. 1, with the aid of a clock generator 102, oscillating with fixed frequency, which is inserted between the output 84 and the AND element 68 of the control device 54, and is activated by the high-level output signal 94 of the AND element 68.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A hydraulic dual-circuit brake system for a road vehicle having front-axle and rear-axle brake circuits for respective front-wheel and rear-wheel brakes, comprising a brake booster which as a first output pressure chamber allocated to the front-axle brake circuit through a first master brake line and a second output pressure chamber allocated to the rear-axle brake circuit through a second master brake line, master cylinders having master cylinder pistons displaceable therein to different positions under pedal force control for building up brake pressures in the chambers coupled into the front-wheel and the rear-wheel brakes, a valve arrangement operatively connected with the brake circuits selectively to block off a malfunctioning, poorly bled or leakage-failing brake circuit constituted by one of the front-axle and rear-axle brake circuits from the respective first and second master brake line, sensors individually associated with each of the master cylinder pistons and operatively arranged to emit electrical output signals characteristic of the different positions of the master cylinder pistons, and an electronic control device operatively associated with the sensors for processing the output signals to generate a control signal for the valve arrangement, at least when the piston positions represented by the output signals of the sensors deviate by more than a tolerance margin compatible with proper functioning of the brake system, such that the valve arrangement blocks off the malfunctioning, poorly bled or leakage-failing brake circuit, which causes a deviation of a position of the master cylinder piston associated therewith from a set point range, from the master brake line associated with the malfunctioning, poorly bled or leakage-failing brake circuit, wherein the electronic control device includes a comparator operatively arranged to compare positions, represented by the two output signals of the sensors, of the master cylinder pistons to one another and to generate a signal to drive the valve arrangement into a blocking position as soon as the position of the master cylinder piston associated with the front-axle brake circuit corresponds to a stroke which is greater by more than a threshold value than the stroke of the master cylinder piston associated with the rear-axle brake circuit represented by an output signal generated by the sensor associated therewith and allows the output signal to decay again when a difference of strokes of the pistons falls below a smaller threshold value.

2. The hydraulic dual-circuit brake system according to claim 1, wherein a second comparator is operatively arranged in the electronic control device to produce an output signal for driving the valve arrangement into the blocking position when one of the pistons movably delimiting the first output pressure chamber reaches an end position, which corresponds to a maximum output pressure in the case of an intact brake system.

3. The hydraulic dual-circuit brake system according to claim 2, wherein a clock generator is operatively connected between the first-mentioned comparator and the valve arrangement to emit, for as long as the comparator output signal effecting the driving of the valve arrangement into the blocking position is present, pulses in periodic sequence such that the valve arrangement is alternatively switched between a normal throughflow position and the blocking position.

4. The hydraulic dual-circuit brake system according to claim 3, wherein a delay stage is operatively arranged in the electronic control device to effect, after a delay time period of predeterminable duration which begins with the onset of a first signal which effects the driving of the valve arrangement into its blocking position, switching over of the valve arrangement into a normal position which is a throughflow position for a defined time period.

5. The hydraulic dual-circuit brake system according to claim 2, wherein a clock generator is operatively arranged in the system, and the signal used to activate one of the valve arrangement and the clock generator is the output signal of the electronic control device which includes an AND element having a first, non-negated input to which is fed the output signal of the first-mentioned comparator carrying out the position comparison of the pistons and a second, negated input to which is fed an output signal of the second comparator detecting the end position of the master cylinder piston associated with the front-axle brake circuit.

6. The hydraulic dual-circuit brake system according to claim 5, wherein a delay stage is operatively arranged in the electronic control device to effect, after a delay time period of predeterminable duration which begins with the onset of a first signal which effects the driving of the valve arrangement into its blocking position, switching over of the valve arrangement into a normal position which is a throughflow position for a defined time period.

7. The hydraulic dual-circuit brake system according to claim 6, wherein the first-mentioned comparator which compares the output signals of the sensors to one another includes an output stage storage element which, when the position differences of the master cylinder pistons is greater than a threshold value, is set to emit a signal effecting the driving of the valve arrangement into the blocking position and is reset by a comparator output signal which indicates that the position difference is less than a lower threshold value, $\Delta Smin$, which satisfies the relationship: $\Delta Smin \approx \Delta Smax/n$ where $2 < n < 5$ and $\Delta Smax$ for its part being a threshold value which is at most one-third of the maximum displacement path of the master cylinder piston displaceable within the master cylinder which is associated with the front-axle brake circuit.

8. The hydraulic dual-circuit brake system according to claim 7, wherein the clock generator is operatively connected between the first-mentioned comparator carrying out position comparison of the pistons and the valve arrangement to emit, for as long as the comparator output signal effecting the driving of the valve arrangement into the blocking position is present, pulses in periodic sequence such that the valve arrangement is alternately switched between the normal throughflow position and the blocking position.

9. The hydraulic dual-circuit brake system according to claim 5, wherein the AND element has a third, negated input, to which the output of the delay stage is operatively connected for generating an output signal, which, after the passage of the delay period, is present as a high-level signal of the defined time period.

10. The hydraulic dual-circuit brake system according to claim 1, wherein a delay stage is operatively arranged in the electronic control device to effect, after a delay time period of predeterminable duration which begins with the onset of a first signal which effects driving of the valve arrangement into the blocking position, switching over of the valve arrangement into a normal throughflow position for a defined time period.

11. The hydraulic dual-circuit brake system according to claim 10, wherein a second comparator is operatively arranged in the electronic control device to produce an output signal for driving the valve arrangement into the blocking position when one of the pistons movably delimiting the first output pressure chamber reaches an end position, which corresponds to the maximum output pressure in the case of an intact brake system.

12. The hydraulic dual-circuit brake system according to claim 1, wherein the comparator which compares the output signals of the sensors to one another includes an output stage storage element which, when the position differences of the master cylinder pistons is greater than a threshold value, is set to emit a signal effecting the driving of the valve arrangement into the blocking position and is reset by a comparator output signal which indicates that the position difference is less than a lower threshold value, which satisfies the relationship: $\Delta Smin \approx \Delta Smax/n$ where $2 < n < 5$ and $\Delta Smax$ for its part being a threshold value which is at most one-third of the maximum displacement path of the master cylinder piston displaceable within the master cylinder associated with the front-axle brake circuit.

13. The hydraulic dual-circuit brake system according to claim 12, wherein a second comparator is operatively arranged in the electronic control device to produce an output signal for driving the valve arrangement into the blocking position when one of the pistons movably delimiting the first output pressure chamber reaches an end position, which corresponds to a maximum output pressure in the case of an intact brake system.

14. The hydraulic dual-circuit brake system according to claim 13, wherein a delay stage is operatively arranged in the electronic control device to effect, after a delay time period of predeterminable duration which begins with an onset of a first signal which effects driving of the valve arrangement into the blocking position, switching over of the valve arrangement into a normal position which is a throughflow position for a defined time period.

15. The hydraulic dual-circuit brake system according to claim 1, wherein the brake booster comprises the master cylinders which are two in number, each of the cylinders being allocated to respective ones of the brake circuits and arranged next to one another so as to form a twin master cylinder with central axes of the cylinders being parallel, and a moment-compensating rocker for actuation of the pistons, with ratio of cross-sectional areas of the pistons corresponding to a ratio of brake fluid quantities displaceable into the master brake lines of the front-axle brake circuit and of the rear-axle brake circuit to achieve a desired brake pressure.

16. The hydraulic dual-circuit system according to claim 15, wherein a second comparator is operatively arranged in the electronic control device to produce an output signal for driving the valve arrangement into the blocking position when the pressure chamber reaches the end position, which corresponds to the maximum output pressure in the case of an intact brake system.

17. The hydraulic dual-circuit brake system according to claim 16, wherein a delay stage is operatively arranged in the electronic control to effect, after a delay time period of predeterminable duration which begins with the onset of a first signal which effects the driving of the valve arrangement into its blocking position, switching over of the valve arrangement into a normal position which is a throughflow position for a defined time period.

18. The hydraulic dual-circuit brake system according to claim 17, the first-mentioned comparator which compares the output signals of the sensors to one another includes an output stage storage element which, when the position differences of the master cylinder pistons is greater than a threshold value, is set to emit a signal effecting the driving of the valve arrangement into a blocking position and is reset by a comparator output signal which indicates that the position difference is less than a lower threshold value, $\Delta Smin$, which satisfies the relationship: $\Delta Smin \approx \Delta Smax/n$ where $2 < n < 5$ and $\Delta Smax$ for its part being a threshold value which is at most one-third of the maximum displacement path of the master cylinder piston displaceable within the master cylinder which is associated with the front-axle brake circuit.

19. The hydraulic dual-circuit brake system according to claim 18, wherein a clock generator is operatively connected between the first-mentioned comparator and the valve arrangement to emit, for as long as the comparator output signal effecting the driving of the valve arrangement into the blocking position is present, pulses in periodic sequence such that the valve arrangement is alternately switched between the normal position and the blocking position.

20. The hydraulic dual-circuit brake system according to claim 19, wherein the signal used to activate one of the valve arrangement and the clock generator is the output signal of the electronic control device which includes and AND element having a first, non-negated input to which is fed the output signal of the first-mentioned comparator carrying out the position comparison of the pistons and a second, negated input to which is fed an output signal of the second comparator detecting the end position of the master cylinder piston displaceable within the master cylinder which is associated with the front-axle brake circuit.

21. The hydraulic dual-circuit brake system according to claim 20, wherein the AND element has a third, negated input, to which the output of the delay stage is operatively connected for generating an output signal which, after the passage of the delay period, is present as a high-level signal of a defined time period.

22. The hydraulic dual-circuit brake system according to claim 1, wherein the valve arrangement comprises at least one inlet valve of an anti-locking system associated with the front-axle brake circuit on the vehicle.

* * * * *